US005672651A

United States Patent [19]

Smith

[11] Patent Number: 5,672,651
[45] Date of Patent: Sep. 30, 1997

[54] DURABLE REPELLENT FLUOROCHEMICAL COMPOSITIONS

[75] Inventor: Richard S. Smith, Mendota Heights, Minn.

[73] Assignee: Minnesota Mining and Manufacturing Company, St. Paul, Minn.

[21] Appl. No.: 545,917

[22] Filed: Oct. 20, 1995

[51] Int. Cl.$^6$ .............................. C08J 3/00; C08K 3/20; C08L 75/00; C08G 18/28

[52] U.S. Cl. .................. 524/590; 524/307; 524/507; 524/591; 525/123; 525/455; 528/70

[58] Field of Search ........................... 524/591, 590, 524/307, 507; 528/70; 525/123, 455

[56] References Cited

U.S. PATENT DOCUMENTS

| | | | |
|---|---|---|---|
| 3,398,182 | 8/1968 | Guenthner et al. | 260/455 |
| 3,896,251 | 7/1975 | Landucci | 428/290 |
| 3,916,053 | 10/1975 | Sherman et al. | 428/96 |
| 4,029,585 | 6/1977 | Dettre et al. | 252/8.6 |
| 4,264,484 | 4/1981 | Patel | 260/29.6 |
| 4,289,892 | 9/1981 | Soch | 560/26 |
| 4,540,497 | 9/1985 | Chang et al. | 252/8.8 |
| 4,606,737 | 8/1986 | Stern | 8/115.6 |
| 4,958,039 | 9/1990 | Pechhold | 556/421 |
| 5,025,052 | 6/1991 | Crater et al. | 524/104 |
| 5,098,774 | 3/1992 | Chang | 428/267 |
| 5,316,850 | 5/1994 | Sargent et al. | 428/378 |
| 5,350,795 | 9/1994 | Smith et al. | 524/507 |
| 5,410,073 | 4/1995 | Kirchner | 560/357 |
| 5,411,766 | 5/1995 | Kirchner | 427/393.4 |
| 5,414,111 | 5/1995 | Kirchner | 560/357 |

OTHER PUBLICATIONS

Robert W. Lenz, "*Polymerization Mechanisms and Processes*," Kirk-Othmer Encyclopedia of Chemical Technology, vol. 18, 3d ed., pp. 740–744 (1982).

Mason Hayek, "*Waterproofing and Water/Oil Repellency*," Kirk-Othmer Encyclopedia of Chemical Technology, vol. 24, 3d ed. pp. 442–464 (1982).

*Primary Examiner*—Patrick Niland
*Attorney, Agent, or Firm*—Gary L. Griswold; Walter N. Kirn; John A. Burtis

[57] ABSTRACT

This invention provides compositions for treating fibrous substrates to render those substrates durably repellent to water and oil and durably resistant to dry soil comprising a fluorochemical polymer formed by: (a) reacting a tri- or higher order isocyanate with a fluorochemical alcohol; (b) reacting the resulting product with an amount of water sufficient to react with between 5 and 50% of the isocyanate groups present in the product compound; and (c) thereafter reacting the product with a difunctional poly(oxyalkylene)-containing material.

The present invention also provides a method of treating fibrous substrates to render those substrates durably repellent to water and oil and durably resistant to dry soil comprising application of the aforementioned composition to a fibrous substrate with one or more hydrophilic anti-staining compounds such as acrylic and methacrylic acid polymers and copolymers, sulfonated phenol-formaldehyde resins, and styrene-maleic anhydride polymers and copolymers, said application of the composition taking place either coincident with or following application of the hydrophilic anti-staining compound or compounds to the substrate. Fibrous substrates treated according to this method and fibrous substrates treated with the aforementioned compositions are also disclosed.

10 Claims, No Drawings

DURABLE REPELLENT FLUOROCHEMICAL COMPOSITIONS

FIELD OF THE INVENTION

This invention relates to the treatment of fibrous materials, particularly carpets, with fluorochemical compositions to impart durable water and oil repellency and durable dry soil resistance thereto.

BACKGROUND OF THE INVENTION

The treatment of various fibrous substrates, notably carpets, textiles, leathers and papers, with fluoroaliphatic group-containing polymers and oligomers enabling them to retain their original aesthetic appeal (e.g., to render them repellent to water- and oil-based stains and resistant to soils) has been known in the art for many years. Mason Hayek, *Waterproofing and Water/Oil Repellency*, in 24 KIRK-OTHMER ENCYCLOPEDIA OF CHEMICAL TECHNOLOGY 448–65 (3d ed. 1979), for example, provides a general overview of anti-staining and anti-soiling technology for fibrous substrates.

Fluorochemicals known to be useful for treating carpets include ester oligomers, as disclosed in U.S. Pat. No. 4,264,484 (Patel), carbodiimide oligomers, as disclosed in U.S. Pat. No. 3,896,251 (Landucci), guanidine oligomers, as disclosed in U.S. Pat. No. 4,540,497 (Chang), allophanate oligomers, as disclosed in U.S. Pat. No. 4,606,737 (Stem), oxazolidinone oligomers, as disclosed in U.S. Pat. No. 5,025,052 (Crater et al.), and acrylic polymers, as disclosed in U.S. Pat. No. 3,916,053 (Sherman et al.).

Fluorochemical urethane, urea, and biuret oligomers have often become the treatment of choice for carpets due to their durable soil-resistance properties. For example, U.S. Pat. No. 3,398,182 (Guenthner et al.) discloses the use of fluoroaliphatic urethanes in making oleophobic and hydrophobic coatings that resist removal by abrasion.

U.S. Pat. No. 5,350,795 (Smith et al.) discloses substantially organic solvent-free, aqueous solutions or dispersions for treating textile fibers and fabrics to impart oil and water repellency without thermal treatment comprising (a) a fluorochemical acrylate copolymer comprising the reaction product of a fluorinated acrylate monomer, polyoxyalkylene glycol acrylate or methacrylate, and polyoxyalkylene glycol diacrylate or dimethacrylate, and (b) a polyalkoxylated polyurethane having pendant perfluoroalkyl groups comprised of an aliphatic or aromatic tri- or higher order isocyanate, a fluorinated alcohol, amine or mercaptan, and a poly(oxyalkylene) diol or dithiol, the polyurethane having a weight average molecular weight of over 40,000.

U.S. Pat. Nos. 5,410,073 (Kirchner), 5,411,766 (Kirchner) and 5,414,111 (Kirchner) each describes polyfluoro nitrogen containing organic compounds made by reacting (a) at least one polyisocyanate or mixture of polyisocyanates that contain at least three isocyanate groups per molecule with (b) at least one fluorochemical compound which contains per molecule (i) a single functional group having one or more Zerewitinoff hydrogen atoms and (ii) at least two carbon atoms each of which contains at least two fluorine atoms, the amount of fluorochemical compound being sufficient to react with 95% to 40% of the isocyanate groups, (c) then reacting the reaction product of (a) and (b) with water in an amount to react with the about 5% to about 60% of remaining isocyanate groups; such compounds when applied to fibers and fabrics reportedly provide durable water-, oil- and soil-repellent and/or soil release properties to the fibrous substrate. U.S. Pat. No. 5,414,111 teaches specifically the use of a monofunctional, non-fluorinated organic compound as an optional reactive component.

SUMMARY OF THE INVENTION

Briefly, in one aspect, this invention provides compositions for treating fibrous substrates to render those substrates durably repellent to water and oil and durably resistant to dry soil comprising a fluorochemical polymer formed by: (a) reacting a tri- or higher order isocyanate with a fluorochemical alcohol, and optionally, with an aliphatic hydrocarbon alcohol present in up to an equal molar mount relative to the fluorochemical alcohol; (b) reacting the resulting product with an mount of water sufficient to react with between 5% and 50% of the isocyanate groups present in the product compound; and (c) thereafter reacting the product with a difunctional poly(oxyalkylene)-containing material.

In another aspect, the present invention provides a method of treating fibrous substrates to render those substrates durably repellent to water and oil and durably resistant to dry soil comprising application of the aforementioned composition to a fibrous substrate with one or more hydrophilic anti-staining compounds such as acrylic and methacrylic acid polymers and copolymers, sulfonated phenolformaldehyde resins, and styrene-maleic anhydride polymers and copolymers, said application of the composition taking place either coincident with or following application of the hydrophilic anti-staining compound or compounds to the substrate.

In yet another aspect, the present invention provides fibrous substrates treated with these compositions imparting to those substrates appearance-retention properties such as durable dynamic and static repellency, stain release, and soil repellency.

DETAILED DESCRIPTION OF THE INVENTION

The fluorochemical treatments of the present invention are fluorochemical, poly(oxyalkylene)-containing, urethane-urea polymers formed from the reaction of, in sequence: (1) a tri- or higher order isocyanate; (2) a stoichiometric amount of a fluorochemical alcohol sufficient to react with between 30% and 70% of the isocyanate (i.e., —NCO) groups; (3) a stoichiometric amount of water sufficient to react with between 5% and 50% of the isocyanate groups; and (4) a stoichiometric amount of a difunctional poly(oxyalkylene)-containing material sufficient to react with between 15% and 50% of the isocyanate groups. In forming the fluorochemical polymer, a limited mount of a hydrocarbon alcohol also may optionally be combined with the fluorochemical alcohol. When so combined, the hydrocarbon alcohol is be present in no greater than a 1:1 molar ratio with respect to the fluorochemical alcohol, and together, a stoichiometric amount of the two components sufficient to react with between 30% and 70% of the isocyante groups should be used.

These above-described monomers, reacted in sequence, provide a fluorochemical polymer that is readily emulsifiable in water, that provides a thermally stable aqueous emulsion, and that is suitable for application onto a substrate by a variety of methods. Such fluorochemical polymers may be combined, and in many cases are preferably combined, with one or more fluorochemical esters that, when co-applied to a fibrous substrate along with the fluorochemical polymers, impart superior oil and water repellency to those substrates.

The fluorochemical treatments of the invention find particular utility when applied onto a substrate that is also treated with one or more hydrophilic anti-staining compounds (sometimes generically referred to as "stainblockers") such as acrylic and methacrylic acid polymers and copolymers, sulfonated phenolformaldehyde resins, and styrene-maleic anhydride polymers and copolymers. Substrates, particularly carpets, that are so treated exhibit superior resistance to soiling and superior repellency to water and oil-borne stains.

Typically, the treatment compositions in accordance with this invention are emulsions of from about 10 to about 30 weight percent of the above-described fluorochemical polymer and, if present in the composition, collectively from 0 to about 10 weight percent of one or more fluorochemical esters. Economic factors will compel the choice of aqueous emulsions in most circumstances, though other suitable solvents may also be used to create the emulsion with similar utility.

The treatment compositions are typically applied to the carpet at levels from 0.1 to 10 weight percent solids, based on the weight of the fiber or fabric. Nonionic, anionic, or amphoteric surfactants may also be used as dispersants for the composition for the application. Substrates also treated with a stainblocker typically will contain between 0.15 and 3 weight percent of one or more of the hydrophilic anti-staining compounds based on the weight of the fiber.

The fluorochemical, poly(oxyalkylene)-containing, urethane-urea polymers of the invention are formed by, in sequence: (a) reacting the tri- or higher order isocyanate with a fluorochemical alcohol, and also optionally with a limited amount of a hydrocarbon alcohol; (b) reacting the resulting product with an amount of water sufficient to react with between 5% and 50% of the isocyanate groups; and (c) thereafter reacting the product with a difunctional poly(oxyalkylene)-containing material. The polymerization reaction may be carried out in accordance with well-known techniques such as, for example, by condensation polymerization in methylisobutyl ketone (MIBK) using a small amount of a dibutyltin dilaurate catalyst. The polymer, formed in such a manner, may be emulsified in water and may optionally be combined with one or more fluorochemical esters. One or more suitable surfactants may be used to stabilize the emulsion.

Any isocyanates having at least three isocyanate functionalities may be used in the preparation of the fluorochemical polymer. Among this class of useful compounds are aliphatic triisocyanate-functional biurets of the formula:

wherein x is an integer greater than or equal to 1, and $R_h$ is a divalent cyclic or noncyclic alkylene, arylene, or acylene group and may be, for example, hexamethylene, toluene, or cyclohexylene. Also useful are isocyanurate trimers of the formula:

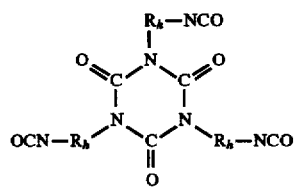

wherein $R_h$ is as previously described. Where isocyanurate trimers are used, the inclusion of a fluorochemical ester, particularly an adipate ester, in the treatment emulsion is preferred.

Because of their widespread commercial availability, polyisocyanate-functional biurets and isocyanurates derived from the homopolymerization of hexamethylene diisocyanate are preferred for use in accordance with this invention. Such compounds are sold, for example, under the Desmodur tradename, whose products are available from Miles Corp.

Representative fluoroaliphatic alcohols useful in forming the fluorochemical, poly(oxyalkylene)-containing, urethane-urea compositions may be depicted by the formula:

wherein:

$R_f$ represents a fluorinated carbon chain having from 3 to about 20 carbon atoms, more preferably having from about 6 to about 14 carbon atoms; $R_f$ can contain straight chain, branched chain, or cyclic fluorinated alkylene groups or combinations thereof with straight chain, branched chain or cyclic alkylene groups; $R_f$ is preferably free of polymerizable olefinic unsaturation and can optionally contain catenary heteroatoms such as oxygen, divalent or hexavalent sulfur, or nitrogen; a fully fluorinated radical is preferred, but hydrogen or chlorine atoms may be present as substituents provided that not more than one atom of either is present for every two carbon atoms; the terminal portion of the $R_f$ group is fully fluorinated, preferably containing at least 7 fluorine atoms, e.g., $CF_3CF_2CF_2-$, $(CF_3)_2CF-$, $-CF_2SF_5$ or the like. Preferably, $R_f$ contains from about 40% to about 80% fluorine by weight, more preferably from about 50% to about 78% fluorine by weight; perfluorinated aliphatic groups (i.e., those of the formula $C_nF_{2n+1}-$) are the most preferred embodiments of $R_f$; and Q represents a multivalent, generally divalent, linking group such as an alkylene (e.g., ethylene), an arylene (e.g., phenylene), a combination of an alkylene and an arylene (e.g., xylene), an oxydialkylene (e.g., $CH_2CH_2OCH_2CH_2$), a thiodialkylene (e.g., $CH_2CH_2SCH_2CH_2$), a sulfonamidoalkylene (e.g., $SO_2N(CH_2CH_3)CH_2CH_2$), a carbonamidoalkylene (e.g., $CONHCH_2CH_2CH_2$), or a sulfonamidodialkylene (e.g., $CH_2CH_2SO_2NHCH_2CH_2$).

A mixture of one or more such fluorochemical alcohols are also considered useful.

Representative fluorochemical alcohols include $C_8F_{17}SO_2N(CH_3)C_2H_4OH$ (MeFOSE), available for example from 3M Co., and those alcohols of the formula $C_nF_{2n+1}CH_2CH_2OH$ wherein n is an integer from about 3 to about 20. Fluorochemical alcohols of the latter type are commercially available, for example, under the Zonyl trademark from DuPont Corp.

The hydrocarbon alcohols that optionally may be combined with the fluorochemical alcohol or alcohols in the formation of the fluorochemical poly(oxyalkylene) urethane-urea compositions of the invention may be used to reduce the overall cost of the treatment composition without suffering an attendant reduction in the performance obtained by the fluorochemical properties of the treatments. If employed, the hydrocarbon alcohols should not be added in greater than a 1:1 molar ratio to the fluorochemical alcohol or alcohols. Useful hydrocarbon alcohols include straight chain, branched chain, or cylcic aliphatic hydrocarbon alcohols containing from 1 to 36, preferably from 10 to 24, carbon atoms. Such aliphatic alcohols are preferably free of polymerizable olefinic unsaturation and optionally can contain catenary heteroatoms such as oxygen, divalent or hexavalent sulfur, or nitrogen. Representative useful hydrocarbon alcohols include stearyl alcohol and lauryl alcohol.

The difunctional poly(oxyalkylene)-containing materials useful in accordance with the invention include any of those compounds containing multiple poly(oxyalkylene) functionality. A class of such materials may be represented by the general formula:

wherein $(OR^1)_x$ is a poly(oxyalkylene) chain having a plurality of oxyalkylene groups, $(OR^1)$, wherein the $R^1$ moieties can be the same or different and are selected from the group consisting of $C_1$ to $C_5$ alkylene radicals, preferably from $C_1$ to $C_3$ radicals, and wherein x is an integer between approximately 5 and 50, giving a poly(oxyalkylene) polymer having a molecular weight between about 200 and about 2000.

The poly(oxyalkylene)-containing materials can be those have a molecular weight of at least about 200, preferably having a molecular weight of about 300 or higher. Poly (oxyalkylene) polyols useful in this invention include, for example, polyethylene glycols sold under the Carbowax trademark, such as Carbowax™ 600 diol, and propylene glycols sold by a variety of venders.

The fluorochemical, poly(oxyalkylene)-containing, urethane-urea treatments may be made according to known polymerization methods by condensation polymerization or by copolymerization using solution, suspension, or bulk polymerization techniques. See, for example, Robert W. Lenz, *Polymerization Mechanisms and Processes*, in 4 KIRK-OTHMER ENCYCLOPEDIA OF CHEMICAL TECHNOLOGY 720 (1982) for a general description of these methods.

Useful fluorochemical esters that may optionally be combined with the fluorochemical, poly(oxyalkylene)-containing, urethane-urea treatments can be formed by reacting a perfluoroalkyl aliphatic alcohol or mixture of alcohols with mono- or polycarboxylic acids that can contain other substituents and that contain from 3 to 30 carbon atoms. Optionally, a mixture of perfluoroalkyl aliphatic alcohol and hydrocarbon alcohols can be esterified with the polycarboxylic acids. Such esters are described, for example, in U.S. Pat. No. 4,029,585 (Dettre et al.) which is incorporated herein by reference.

A particularly preferred fluorochemical ester is the adipate ester that can be represented by the formula

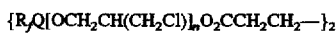

wherein $R_f$ and Q are as previously defined for the fluorochemical alcohol and wherein n is an integer between 1 to 5 inclusive. Such fluorochemical adipate esters, and the preparation thereof, are disclosed by U.S. Pat. No. 4,264,484 (Patel) which is herein incorporated by reference.

Also useful in the present invention as substrate treatments are blends of the fluorochemical, poly(oxyalkylene) -containing, urethane-urea treatments with fluorine-free extender compounds. These extender compounds, which are only optional components of the system, may be added to reduce the overall expense of the treatment without limiting the performance obtained by the fluorochemical characteristic of the applied treatment. Among the fluorine-free compounds useful as treatment extenders are siloxanes, acrylate and substituted acrylate polymers and copolymers, N-methylolacrylamide-containing acrylate polymers, urethanes, blocked isocyanate-containing polymers and oligomers, condensates or precondensates of urea or melamine with formaldehyde, glyoxal resins, condensates of fatty acids with melamine or urea derivatives, condensation of fatty acids with polyamides and their epichlorohydrin adducts, waxes, polyethylene, chlorinated polyethylene, alkyl ketene dimers, esters, and amides. Blends of these fluorine-free extender compounds are also considered useful. The relative amount of the extender compounds in the treatment is not critical to the present invention. The overall composition of the fluorochemical treatment should contain, however, relative to the mount of solids present in the overall system, at least 3 weight percent, preferably at least about 5 weight percent, carbon-bound fluorine.

The fluorochemical, poly(oxyalkylene)-containing, urethane-urea treatments preferably are applied to a substrate along with one or more non-fluorinated compounds known in the art to impart anti-staining properties when applied to a substrate with a fluorochemical agent. These anti-staining compounds may constitute a pretreatment to application of the fluorochemical treatments of the invention, i.e., they can be applied prior to the application of the fluorochemical treatment, or alternatively may be applied coincident with the fluorochemical treatment, i.e., in the same processing step. These compounds, known in the art generally as "stainblockers," include hydrophilic anti-staining compounds such as acrylic and methacylic acid polymers and copolymers, sulfonated phenolformaldehyde resins, and styrene-maleic anhydride polymers and copolymers. Blends of such compounds are also considered useful. Additional non-fluorinated anti-staining compounds suitable for use in the invention include those sulfonated novolak resin compositions described by U.S. Pat. Nos. 5,098,774 (Chang) and 5,316,850 (Sargent et at.), both of whose descriptions are herein incorporated by reference. The anti-staining compositions typically are applied to the substrate at levels between 0.15 and 3 weight percent of the hydrophilic anti-staining compound or compounds based on the weight of the fiber.

Fibrous substrates that can be treated in accordance with the invention are textile fibers (or filaments) and fabrics, including fabrics made into finished products, made from cotton, polyester, polyolefin, polyamide, acrylic, acetate or blends thereof, as well as finished garments, upholstered furniture, and installed carpet. The fibers or filiments as such or in aggregated form, e.g., yarn, tow, web or roving, or fabric such as woven or knit fabric can be treated with the composition of the invention.

The aqueous composition containing the fluorinated treatment may be applied to a fibrous substrate using any state of the art application method. Typically, the composition will be applied by spraying directly and evenly onto the dry or prewet substrate, by immersing (e.g., padding) the substrate into the composition, or by foam application of the composition onto the substrate, spray application being the preferred method of application. The treatment usually is then heat cured by drying the treated substrate in an oven held at between 200° F. and 300° F., although the treatment may also be left to cure onto the substrate under ambient conditions. The concentration of the fluorochemical treatment within the complete aqueous composition of this invention may be independently chosen to yield a desired concentration of treatment on the finished substrate given a choice of processing parameters, e.g., roller speed, drying capacity, et cetera.

The following examples are offered to aid in a better understanding of the present invention. These examples are not to be construed as an exhaustive compilation of all embodiments of the present invention and are not to be unnecessarily construed as limiting the scope thereof.

EXAMPLES

Carpets Evaluated

Style 1699 Nylon 6 Carpet—light cream color, having a face weight of 38 oz/yd$^2$ (1.3 kg/m$^2$) and previously mill-treated with 3M Brand Stain Release Concentrate FX-657 at 1.5% SOC (solids on carpet) using a flex-nip application procedure (available from Shaw Industries)

Upbeat Nylon 6 Carpet—cream color, having a face weight of 28 oz/yd$^2$ (1.0 kg/m$^2$) and previously mill-treated with 3M Brand Stain Release Concentrate FX-657 at 0.8% SOC using a flex-nip application procedure (available from Shaw Industries)

MO-678 Nylon 6 Carpet—cream color, having a face weight of 38 oz/yd$^2$ (1.3 kg/m$^2$), untreated with stainblocker (available from Shaw Industries). The carpet was subsequently treated with 3M Brand Stain Release Concentrate FX-661 (a 29.5% solids aqueous solution containing a blend of sulfonated novolac and acrylic stainblockers, available from 3M Co.) at 1.5% SOC using the following lab-simulated flex-nip application procedure.

A section of carpet was cut into approximately 5 inch×4 inch (13 cm×10 cm) rectangular samples weighing approximately 17 g each. The carpet samples were immersed in deionized water at room temperature until totally wet. The wet carpet samples were then removed from the water and were extracted using a Book Centrifugal Extractor until the samples were damp. The damp carpet samples were then steamed for 2 minutes at atmospheric pressure, 90°–100° C. and 100% relative humidity.

After steaming, the carpet samples were allowed to cool to room temperature, and each carpet sample was treated with FX-661 stainblocker at 1.5% SOC by absorbing 76.5 g of treatment solution containing 0.86 g of FX-661 (0.26 g solids) and 0.38 g of MgSO$_4$ in deionized water with pH adjusted to 2.5 using 10% aqueous sulfamic acid.

The wet treated carpet samples were immediately steamed again for an additional 2 minutes, immersed briefly in a 5-gallon bucket half full of water, rinsed thoroughly under a water stream to remove excess stainblocker and acid, spun to dampness using the centrifugal extractor, rerinsed with deionized water, spun to dampness again, and allowed to air-dry at least overnight at room temperature before further testing.

Raw Materials Used For Synthesis

Desmodur™ N-100 Isocyanate-a triisocyanate-functional biuret derived from reacting 3 moles of 1,6-hexamethylene diisocyanate with 1 mole of water (available from Miles Corp.).

Desmodur™ N-3300 Isocyanate-a triisocyanate-functional isocyanurate derived from trimerizing 3 moles of 1,6-hexamethylene diisocyanate (available from Miles Corp.).

MeFOSE Fluorochemical Alcohol->85% $C_8F_{17}SO_2N(CH_3)C_2H_4OH$ (available from 3M Co.).

Zonyl™ BA Fluorochemical Alcohol-believed to be primarily $C_nF_{2n+1}CH_2CH_2OH$, where n is predominantly 4, 6 and 8 (available from Dupont Corp.).

Carbowax™ 300 Glycol-an approximately 300 molecular weight polyethylene glycol (available from Union Carbide Corp.).

Carbowax™ 550 Alcohol-an approximately 550 molecular weight methoxyethylene glycol monomethyl ether (available from Union Carbide Corp.).

Carbowax™ 600 Glycol-an approximately 600 molecular weight polyethylene glycol (available from Union Carbide Corp.).

Carbowax™ 750 Alcohol-an approximately 750 molecular weight methoxypolyethylene glycol (available from Union Carbide Corp.).

Carbowax™ 1450 Glycol-an approximately 1450 molecular weight polyethylene glycol (available from Union Carbide Corp.).

PPG-425 Glycol-an approximately 425 molecular weight polypropylene glycol (available from Aldrich Chem. Co. As Catalog #20,230-4).

PPG-1000 Glycol-an approximately 1000 molecular weight polypropylene glycol (available from Aldrich Chem. Co. As Catalog #20,230-4).

PREPARATION OF FLUOROCHEMICAL TREATMENTS

The following general reaction scheme was used to prepare all the fluorochemical treatments applied to and evaluated on polyamide carpets.

Into a one liter, three-necked flask equipped with with an overhead stirrer, a thermometer and a reflux condensor with a nitrogen inlet were placed the desired quantities of isocyanate and fluorochemical alcohol, along with a hydrocarbon alcohol if one was employed, 200 g of methylisobutyl ketone and 5 drops of dibutyltin dilaurate. The resulting mixture was heated to 80° C. for six hours to complete the urethane reaction, the desired quantity of deionized water was added, and the temperature was maintained at 80° C. overnight to complete the urea reaction. Then the desired quantity of poly(oxyalkylene) glycol or alcohol was added, the temperature was kept at 80° C., and the reaction was allowed to continue until no free isocyanate was detected by infrared spectroscopy, representing full conversion of the remaining isocyanate groups to urethane groups. 166 g of the resulting polymer solution was mixed with 104 g of methyl isobutyl ketone (MIBK) and this mixture was emulsified in 400 g of deionized water containing 4% (wt) Siponate™ DS-10 (sodium dodecylbenzenesulfonate, available from Rhone-Poulenc, Inc.) using a Branson Sonifier™ 450 ultrasonic horn (available from VWR Scientific). The MIBK was removed under reduced pressure to yield an aqueous polymer dispersion containing 20–25% fluorochemical treatment solids.

Fluorochemical Treatment A

Fluorochemical Treatment A, a fluorochemical, poly (oxyalkylene)-containing, urethane-urea treatment of this invention, was prepared by reacting the following:

114 g (0.2 mol)-Desmodur N-100 Isocyanate 180 g (0.33 mol)-MeFOSE Fluorochemical Alcohol 1.35 g (0.075 mol)-deionized water 45 g (0.075 mol)-Carbowax™ 600 Glycol

Fluorochemical Treatment B

Fluorochemical Treatment B, a fluorochemical, poly (oxyalkylene)-containing, urethane-urea treatment of this invention, was prepared by reacting the following:

116.4 g (0.2 mol)-Desmodur N-3300 Isocyanate 180 g (0.33 mol)-MeFOSE Fluorochemical Alcohol 1.40 g (0.078 mol)-deionized water
45 g (0.075 mol)-Carbowax™ 600 Glycol

Fluorochemical Treatment C

Fluorochemical Treatment C, a fluorochemical, poly(oxyalkylene)-containing, urethane-urea treatment of this invention, was prepared by reacting the following:

114 g (0.2 mol)-Desmodur N-100 Isocyanate
153 g (0.33 mol)-Zonyl™ BA Fluorochemical Alcohol
1.35 g (0.075 mol)-deionized water
45 g (0.075 mol)-Carbowax™ 600 Glycol

Fluorochemical Treatment D

Fluorochemical Treatment D, a fluorochemical, poly(oxyalkylene)-containing, urethane-urea treatment of this invention, was prepared by reacting the following:

114 g (0.2 mol)-Desmodur N-100 Isocyanate
180 g (0.33 mol)-MeFOSE Fluorochemieal Alcohol
1.35 g (0.075 mol)-deionized water
22.5 g (0.075 mol)-Carbowax™ 300 Glycol

Fluorochemical Treatment E

Fluorochemical Treatment E, a fluorochemical, poly(oxyalkylene)-containing, urethane-urea treatment of this invention, was prepared by reacting the following:

114 g (0.2 mol)-Desmodur N-100 Isocyanate
180 g (0.33 mol)-MeFOSE Fluorochemical Alcohol
1.35 g (0.075 mol)-deionized water
108.8 g (0.075 mol)-Carbowax™ 1450 Glycol

Fluorochemical Treatment F

Fluorochemical Treatment F, a fluorochemical, poly(oxyalkylene)-containing, urethane-urea treatment of this invention, was prepared by reacting the following:

114 g (0.2 mol)-Desmodur N-100 Isocyanate
180 g (0.33 mol)-MeFOSE Fluorochemical Alcohol
1.35 g (0.075 mol)-deionized water
31.9 g (0.075 mol)-PPG-425 Glycol

Fluorochemical Treatment G

Fluorochemical Treatment G, a fluorochemical, poly(oxyalkylene)-containing, urethane-urea treatment of this invention, was prepared by reacting the following:

114 g (0.2 mol)-Desmodur N-100 Isocyanate
180 g (0.33 mol)-MeFOSE Fluorochemical Alcohol
1.35 g (0.075 mol)-deionized water
75 g (0.075 mol)-PPG-1000 Glycol

Fluorochemical Treatment H

Fluorochemical Treatment H, a fluorochemical, poly(oxyalkylene)-containing, urethane-urea treatment of this invention, was prepared by reacting the following:

114 g (0.2 mol)-Desmodur N-100 Isocyanate
118.8 g (0.22 mol)-MeFOSE Fluorochemical Alcohol
1.35 g (0.075 mol)-deionized water
45 g (0.075 mol)-Carbowax™ 600 Glycol
29.7 g (0.11 mol)-stearyl alcohol

Fluorochemical Treatment I

Fluorochemical Treatment I, a fluorochemical, poly(oxyalkylene)-containing, urethane-urea treatment of this invention, was prepared by reacting the following:

114 g (0.2 mol)-Desmodur N-100 Isocyanate
118.8 g (0.22 mol)-MeFOSE Fluorochemical Alcohol
1.35 g (0.075 mol)-deionized water
22.5 g (0.075 mol)-Carbowax™ 300 Glycol
29.7 g (0.11 mol)-stearyl alcohol

Fluorochemical Treatment J

Fluorochemical Treatment J, a comparative fluorochemical, poly(oxyalkylene)-containing, urethane treatment was prepared by reacting the following:

114 g (0.2 mol)-Desmodur N-100 Isocyanate
200 g (0.37 mol)-MeFOSE Fluorochemical Alcohol
75.6 g (0.126 mol)-Carbowax™ 600 Glycol (water was omitted)

Fluorochemieal Treatment K

Fluorochemical Treatment K, a comparative fluorochemical, poly(oxyalkylene)-containing, urethane-urea was prepared by reacting the following:

114 g (0.2 mol)-Desmodur N-100 Isocyanate
180 g (0.33 mol)-MeFOSE Fluorochemical Alcohol
1.40 g (0.078 mol)-deionized water
82.5 g (0.15 mol)-Carbowax™ 550 Alcohol

Fluorochemical Treatment L

Fluorochemical Treatment L, a comparative fluorochemical, poly(oxyalkylene)-containing, urethane-urea treatment was prepared by reacting the following:

114 g (0.2 mol)-Desmodur N-100 Isocyanate
200 g (0.37 mol)-MeFOSE Fluorochemical Alcohol
1.40 g (0.078 mol)-deionized water
44 g (0.08 mol)-Carbowax™ 550 Alcohol

Fluorochemical Treatment M

Fluorochemical Treatment M, a comparative fluorochemical, poly(oxyalkylene)-containing, urethane-urea (containing monofunctional poly(oxyethylene) segments), was prepared by reacting the following:

114 g (0.2 mol)-Desmodur N-100 Isocyanate
171.7 g (0.37 mol)-Zonyl™ BA Fluorochemical Alcohol
1.40 g (0.078 mol)-deionized water
44 g (0.08 mol)-Carbowax™ 550 Alcohol

Fluorochemical Treatment N

Fluorochemical Treatment N, a comparative fluorochemical urethane containing no urea functionality, was prepared by reacting the following:

114 g (0.2 mol)-Desmodur N-100 Isocyanate
180 g (0.33 mol)-MeFOSE Fluorochemical Alcohol
1.35 g (0.075 mol)-ethylene glycol
45 g (0.075 mol)-Carbowax™ 600 Glycol

Fluorochemical Treatment O

Fluorochemical Treatment O, a comparative fluorochemical polyoxyalkylene urethane treatment was prepared by reacting the following:

114 g (0.2 mol)-Desmodur N-100 Isocyanate
200 g (0.37 mol)-MeFOSE Fluorochemical Alcohol
172.5 g (0.23 mol)-Carbowax™ 750 Glycol (water was omitted)

Fluorochemical Treatment P

Fluorochemical Treatment P is a fluorochemical adipate ester as described in U.S. Pat. No 4,264,484, Example 8, formula XVII.

TEST PROCEDURES USED

Treated carpet samples were subjected to the following test procedures considered important to the carpet industry.

Spray Application and Curing Procedure

Each fluorochemical treatment was applied to a polyamide carpet sample by spray application at 10% wet pick-up. The amount of fluorochemical concentrate added to the aqueous treatment solution was determined by the desired parts per million (ppm) level of fluorine desired on the carpet, typically 500 ppm fluorine. Spray application was accomplished by using a laboratory-sized spray booth with conveyor which was designed to mimic the performance of a large-scale commercial spray boom as is conventionally used in carpet mills. The application rate was controlled by varying the conveyor belt speed. The wet treated carpet sample was then cured by drying for 20 minutes in a forced air oven set at 250° F. (121° C.).

Water Repellency Test

Treated carpet samples were evaluated for water repellency using 3M Water Repellency Test V for Floorcoverings (February 1994), available from 3M Company. In this test, treated carpet samples are challenged to penetrations by blends of deionized water and isopropyl alcohol (IPA). Each blend is assigned a rating number as shown below:

| Water Repellency Rating Number | Water/IPA Blend (% by volume) |
|---|---|
| F | (fails water) |
| 0 | 100% water |
| 1 | 90/10 water/IPA |
| 2 | 80/20 water/IPA |

In running the Water Repellency Test, a treated carpet sample is placed on a flat, horizontal surface and the carpet pile is hand-brushed in the direction giving the greatest lay to the yarn. Five small drops of water or a water/IPA mixture are gently placed at points at least two inches apart on the carpet sample. If, after observing for ten seconds at a 45° angle, four of the five drops are visible as a sphere or a hemisphere, the carpet is deemed to pass the test. The reported water repellency rating corresponds to the highest numbered water or water/IPA mixture for which the treated carpet sample passes the described test.

Oil Repellency Test

Treated carpet samples were evaluated for oil repellency using 3M Oil Repellency Test III (February 1994), available from 3M Company, St. Paul, Minn. In this test, treated carpet samples are challenged to penetration by oil or oil mixtures of varying surface tensions. Oils and oil mixtures are given a rating corresponding to the following:

| Oil Repellency Rating Number | Oil Composition |
|---|---|
| F | (fails mineral oil) |
| 1 | mineral oil |
| 2 | 65/35 (vol) mineral oil/n-hexadecane |
| 3 | n-hexadecane |

The Oil Repellency Test is run in the same manner as is the Water Repellency Test, with the reported oil repellency rating corresponding to the highest oil or oil mixture for which the treated carpet sample passes the test.

Dynamic Water Resistance Test

Dynamic water resistance of a carpet sample was determined by inclining the test sample (15.2 cm×15.2 cm) at an angle of 45° from horizontal and impinging 20 mL of deionized water onto the center of the carpet sample through a glass tube with 5 mm inside diameter positioned 45.7 cm above the test sample. The increase in weight (g) of the test sample was measured, with lower weight gains indicating better dynamic water repellency properties.

Staining Test

A treated carpet sample was stained for 2 minutes in an aqueous solution containing 0.007% (wt) of Red Dye FD&C #40 adjusted to a pH of 2.8 with 10% aqueous sulfamic acid and warmed to 65°±5° C. The treated carpet sample was then rinsed by placing under a stream of tap water and is allowed to dry. The degree of staining of the carpet sample was determined by using a Minolta Chroma Meter™ compact tristimulus color analyzer. This color analyzer measures reflected color as "$\Delta a$" readings compared to the color of an unstained carpet sample, where a greater "$\Delta a$" reading relates to a greater amount of red dye staining. "$\Delta a$" readings typically vary from "0" (no staining) to "50" (severe staining).

"Walk-On" Soiling Test

The relative soiling potential of each treatment was determined by challenging both treated and untreated (control) carpet samples under defined "walk-on" soiling test conditions and comparing their relative soiling levels. The test is conducted by mounting treated and untreated carpet squares on particle board, placing the samples on the floor of one of two chosen commercial locations, and allowing the samples to be soiled by normal foot traffic. The amount of foot traffic in each of these areas is monitored, and the position of each sample within a given location is changed daily using a pattern designed to minimize the effects of position and orientation upon soiling.

Following a specific soil challenge period, measured in number of cycles where one cycles equals approximately 10,000 foot-traffics, the treated samples are removed and the amount of soil present on a given sample is determined using colorimetric measurements, making the assumption that the amount of soil on a given sample is directly proportional to the difference in color between the unsoiled sample and the corresponding sample after soiling. The three CIE L*a*b* color coordinates of the unsoiled and subsequently soiled samples are measured using a Minolta 310 Chroma Meter with a D65 illumination source. The color difference value, $\Delta E$, is calculated using the equation shown below:

$$\Delta E = [(\Delta L^*)^2 + (\Delta a^*)^2 + (\Delta b^*)^2]^{1/2}$$

where:

$\Delta L^* = L^*\text{soiled} - L^*\text{unsoiled}$

Δa*=a*soiled−a*unsoiled

Δb*=b*soiled−b*unsoiled

ΔE values calculated from these colorometric measurements have been shown to be qualitatively in agreement with values from older, visual evaluations such as the soiling evaluation suggested by the AATCC, and have the additional advantages of higher precision, being unaffected by evaluation environment or subjective operator differences. Final ΔE values for each sample are calculated as an average of between five and seven replicates.

Shampooing and Steam Cleaning Procedure

The shampooing and steam cleaning procedure used is described in the publication "Shampooing Carpet Samples with Carpet Board Cleaning Machine," *Floorcovering Test Methods*, CPT 106-1995, Apr. 21, 1995 (available from 3M Company). This test method describes the use of an automatic laboratory carpet board cleaning machine designed to reproduce the shampooing of carpets through a hot water extraction process. Hot water at 140° F. (60° C.) is used during all of the testing.

The machine has three stations with a spray nozzle and vacuum cleaner head at each station. The first station sprays soap solution on the carpet samples immediately preceding a vacuum head that moves slowly over the surface of the carpet. The other two stations spray only water for rinsing immediately in front of the vacuum head as it passes over the carpet, removing as much rinse water as possible. A turntable carries the boards with the carpet samples to each station, rotating the samples 90° between stations.

A metering pump delivers the soap from a soap reservoir into the water line connected to the first head. The soap in the reservoir contains 365 g of Bane-Clene™ P.C.A. Formula 5 Powder dissolved in 1 gal (3.8 L) of deionized water. The metering pump delivers a concentration of 0.4 oz (11.4 g) of soap solids to 1 gal (3.8 L) of water to make the soap solution used to shampoo the carpet.

After shampooing and steaming, the wet carpet samples are allowed to dry at room temperature laying flat with the pile up. After drying, the carpet samples are subjected to the repellency, soiling, and staining challenges previously described.

Examples 1-5 and Comparative Examples C1-C6

In Examples 1-4 and Comparative Examples C1-C5, Fluorochemical Treatments A-D, all fluorochemical poly (oxyalkylene) urethane-ureas of this invention, and comparative Fluorochemical Treatments J-N were applied to FX-657 stainblocked Style 1699 Nylon 6 Carpet using the Spray Application and Curing Procedure to give a theoretical fluorine level of 500 ppm SOC (solids on carpet). In Comparative Example C6, NRD-372, a carpet treatment commercially available from DuPont Corp. as a 30% (wt) solids aqueous emulsion, was applied to the carpet in the same way at 500 ppm fluorine. In Example 6, a mixture of 60% (wt) solids of Fluorochemical Treatment A and 40% (wt) solids of Fluorochemical Treatment P, a fluorochemical adipate ester carpet treatment, was coapplied to the carpet in the same way at a total theoretical fluorine level of 500 ppm SOC.

The previously-described Water Repellency Test was run on each treated carpet initially and after each of the Shampooing and Steam Cleaning Procedure's three cycles. The Dynamic Water Resistance Test, the Staining Test, the Oil Repellency Test, and the "Walk-On" Soiling Test were run on the initially treated carpet only (i.e., before the Shampooing and Steam Cleaning Procedure was initiated).

Results for Examples 1-5 and Comparative Examples C1-C6 are presented in Table 1.

TABLE 1

| Ex. | Fluorochemical Treatment | Water Repellency | | | | Dynam. Water Res.is (g) | Stain Resistance (Δa) | Oil Repellency | "Walk-on" Soiling (ΔE) |
|---|---|---|---|---|---|---|---|---|---|
| | | Init. | 1 SC | 2 SC | 3 SC | | | | |
| 1 | A | 1 | 0 | 0 | 0 | 10.6 | 2.9 | F | 4.8 |
| 2 | B | F | F | F | F | 10.7 | 2.4 | F | 6.0 |
| 3 | C | 1 | 0 | 0 | 0 | 16.9 | 5.2 | F | 7.4 |
| 4 | D | 0 | 0 | F | 0 | 11.2 | 2.0 | F | 4.3 |
| 5 | 60% A, 40% P | 1 | 0 | F | 0 | 10.4 | 2.3 | 1 | 4.2 |
| C1 | J | 1 | 0 | F | F | 8.7 | 4.0 | F | 5.4 |
| C2 | K | 2 | F | F | F | 17.5 | 5.7 | F | 4.4 |
| C3 | L | 2 | F | F | F | 18.3 | 4.7 | F | 5.4 |
| C4 | M | 2 | F | F | F | 17.2 | 4.7 | F | 7.0 |
| C5 | N | 2 | F | F | F | 10.3 | 2.1 | F | 5.7 |
| C6 | NRD-372 | F | F | F | F | 10.3 | 1.2 | F | 5.2 |

The data of Table 1 show that on Nylon 6 carpet, a carpet known in the art to be particularly susceptible to soiling and staining, considering all relevent performance criteria, Fluorochemical Treatments A-D of this invention outperform comparative Fluorochemical Treatments J-N and NRD-372 carpet treatments to provide durable water-repellent, stain resistant, and soil-resistant treatments. Fluorochemical Treatments K, L and M (urethane/ureas containing mono- rather than di-functional polyoxyalkylene), particularly, have dished stain resistance and dynamic water resistance. The NRD-372 treatment, containing no poly(oxyalkylene) functionality, is repellency-deficient. The 60/40 blend of the fluorochemical poly(oxyalkylene) urethane/urea and the fluorochemical adipate ester additionally showed improved oil repellency while maintaining other performance features of Fluorochemical Treatment A alone.

Examples 6-12 and Comparative Example C7

In Example 6-8, Fluorochemical Treatments A, B and E, all fluorochemical polyoxyethylene urethane-urea treatments of this invention, were applied to FX-657 stainblocked Upbeat Nylon 6 Carpet using the Spray Application and Curing Procedure to give a theoretical fluorine level of 500 ppm SOC. In Examples 9 and 10, Fluorochemical Treatments F and G, both fluorochemical poly (oxypropylene) urethane-urea treatments of this invention, were applied in the same manner. In Examples 11 and 12, Fluorochemical Treatments H and I, both fluorochemical/hydrocarbon poly(oxyethylene) treatments of this invention, were applied in the same manner. In Comparative Example C7, no treatment was applied to the stainblocked carpet.

The Water Repellency Test was run on each treated carpet initially and after each of three cycles of the Shampooing and Steam Cleaning Procedure. The Dynamic Water Resistance Test, the Staining Test and the "Walk-On" Soiling Test were run on the initially treated carpet only.

Results for Examples 6–12 and Comparative Example C7 are presented in Table 2.

TABLE 2

| Ex. | Fluorochemical Treatment | Water Repellency | | | | Dynamic Water Resistance (g) | Stain Resistance (Δa) | "Walk-On" Soiling (ΔE) |
| --- | --- | --- | --- | --- | --- | --- | --- | --- |
| | | Init. | 1 SC | 2 SC | 3 SC | | | |
| 6 | A | 1 | 0 | 0 | 0 | 6.2 | 1.9 | 4.2 |
| 7 | B | 1 | 0 | 0 | 0 | 6.1 | 1.2 | 4.0 |
| 8 | E | 1 | 0 | 0 | 0 | 5.7 | 2.3 | 3.6 |
| 9 | F | 1 | 0 | F | 0 | 5.6 | 0.9 | 6.0 |
| 10 | G | 1 | 0 | F | F | 5.1 | 1.0 | 4.6 |
| 11 | H | 1 | 0 | 0 | 0 | 5.8 | 1.8 | 3.0 |
| 12 | I | 1 | 0 | F | 0 | 5.9 | 0.8 | 3.8 |
| C7 | None | 0 | F | F | F | 10.8 | 0.1 | 5.5 |

The data of Table 2 show that Fluorochemical Treatments A, B, E, F, G, H and I of this invention all exhibit durable repellency and superior dynamic water resistance to the untreated stainblocked carpet.

Examples 13–14 and Comparative Example C8

In Examples 13–14, a mixture of 60% (wt) solids of Fluorochemical Treatments A and B respectively, both fluorochemical polyoxyethylene urethane-ureas of this invention, and 40% (wt) solids of Fluorochemical Treatment P, a fluorochemical adipate ester, was applied to FX-661 stainblocked MO-678 Nylon 6 Carpet using the Spray Application and Curing Procedure to give a theoretical total fluorine level of 500 ppm SOC. In Comparative Example C8, a mixture of 47% (wt) solids of Fluorochemical Treatment P and 53% (wt) of an antisoiling copolymer of 50/50 (wt %) methyl methacrylate and ethyl methacrylate made as described in U.S. Pat. No. 4,264,484, column 6, lines 6–29 was applied in the same way to give a theoretical total fluorine level of 500 ppm SOC.

The Water Repellency Test was run on each treated carpet initially and after each of three cycles of the Shampooing and Steam Cleaning Procedure. The Dynamic Water Resistance Test, the Staining Test and the "Walk-On" Soiling Test were run on the initially treated carpet only.

Results of Examples 13–14 and Comparative Example C8 are presented in Table 3.

TABLE 3

| Ex. | Fluorochemical Treatment | Water Repellency | | | | | Oil Repellency | "Walk-On" Soiling (ΔE) |
| --- | --- | --- | --- | --- | --- | --- | --- | --- |
| | | Init. | 1 SC | 2 SC | 3 SC | 4 SC | | |
| 13 | 60% A, 40% P | 2 | 2 | 1 | 1 | 0 | 1 | 6.1 |
| 14 | 60% D, 40% P | 2 | 2 | 1 | 1 | 0 | 1 | 6.0 |
| C8 | 47% P + 53% MMA/EMA | 2 | F | F | F | F | 2 | 6.0 |

The data of Table 3 demonstrate that much improved durable water repellency is achieved by use of the fluorochemical treatments of the invention.

Examples 15–18 and Comparative Examples C9–C10

In Examples 15–16 and Comparative Example C9, Fluorochemical Treatments A and E of this invention and comparative Fluorochemical Treatment O were applied to unstainblocked Upbeat Nylon 6 carpet using the Spray Application and Curing Procedure to give a theoretical total fluorine level of 1000 ppm SOC, except that the wet treated carpet was allowed to dry at room temperature for different periods of times after treatment before running the Water Repellency Test. In Examples 17–18 and Comparative Example C10, the same treatments were respectively applied and cured under the same conditions except that the same carpet was stainblocked with mill-applied FX-657 at 0.8% SOC.

Results from Examples 15–18 and Comparative Examples C9–C10 are presented in Table 4.

TABLE 4

| Example | Fluorochemical Treatment | Water Repellency after: | | | |
| --- | --- | --- | --- | --- | --- |
| | | 4 hours | 24 hours | 5 days | 8 days |
| 15 | A | F | F | 0 | 0 |
| 16 | E | F | F | 0 | 0 |
| C9 | O | F | F | F | F |
| 17 | A | F | 0 | 0 | 1 |
| 18 | E | F | F | 0 | 1 |
| C10 | O | F | F | F | F |

The data of Table 4 show that the fluorochemical poly (oxyalkylene) urethane-urea treatments of this invention can be applied under ambient cure conditions to either stainblocked or non-stainblocked carpet to provide a treated carpet repellent to water after several days. The fluorochemical poly(oxyalkylene) urethane treatments containing no urea linkages, however, did not sufficiently cure to provide water repellency during this same period of time.

I claim:

1. A composition suitable for treating fibrous substrates to render them durably repellent to water and oil and durably resistant to dry soil, said composition comprising a fluorochemical polymer having at least one urea linkage formed by: (a) reacting a tri- or higher order isocyanate with one or more alcohols wherein the alcohols together comprise at least 50 mole percent fluorochemical alcohol; (b) reacting the resulting product with an mount of water sufficient to react with between 5 and 50% of the isocyanate groups present in the product compound; and (c) thereafter reacting the product with a difunctional poly(oxyalkylene)-containing material, wherein, both functionalities are isocyanate reactive.

2. The composition of claim 1 wherein the trifunctional isocyanate is an aliphatic triisocyanate-functional biuret.

3. The composition of claim 1 wherein one or more of the fluorochemical alcohols are of the formula:

$$R_f(A)OH$$

wherein:

$R_f$ represents a fluorinated carbon chain having from 3 to about 20 carbon atoms that can contain catenary heteroatoms; said carbon chain may contain hydrogen or chlorine atoms as substituents provided that not more than one atom of either is present for every two carbon atoms; and Q represents a multivalent linking group.

4. The composition of claim 1 further comprising one or more fluorochemical esters.

5. The composition of claim 4 wherein one or more of the fluorochemical esters are adipate esters of the formula:

$$\{R_fQ[OCH_2CH(CH_2Cl)]_nO_2CCH_2CH_2-\}_2$$

wherein n is an integer between 1 and 5 inclusive; Q represents a multivalent linking group; and wherein $R_f$ represents a fluorinated carbon chain having from 3 to about 20 carbon atoms that can contain catenary heteroatoms; said fluorinated carbon chain may contain hydrogen or chlorine atoms as substituents provided that not more than one atom of either is present for every two carbon atoms.

6. The composition of claim 1 further comprising one or more fluorine-free compounds selected from the group consisting of: siloxanes; acrylate polymers and copolymers; N-methylolacrylamide-containing acrylate polymers; urethanes; blocked isocyanate-containing polymers and oligomers; condensates or precondensates of urea or melamine with formaldehyde; glyoxal resins; condensates of fatty acids with melamine or urea; condensation of fatty acids with polyamides; epichlorohydrin adducts of condensates of fatty acids with polyamides; waxes; polyethylene; chlorinated polyethylene; alkyl ketene dimers; esters; and amides.

7. The composition of claim 1 wherein the isocyanate is further reacted with a hydrocarbon alcohol.

8. The composition of claim 7 wherein the hydrocarbon alcohol is an aliphatic alcohol having from 1 to 36 carbon atoms.

9. The composition of claim 7 wherein the hydrocarbon alcohol is stearyl alcohol.

10. An aqueous emulsion comprising the composition of claim 1.

* * * * *

UNITED STATES PATENT AND TRADEMARK OFFICE
CERTIFICATE OF CORRECTION

PATENT NO. : 5,672,651
DATED : September 30, 1997
INVENTOR(S) : Richard S. Smith It is certified that error appears in the above-identified patent and that said Letters Patent is hereby corrected as shown below:

Col. 1, line 27, "(Stem)" should read -- (Stern) --.

Col. 2, line 11, "mount" should read -- amount --.

Col. 2, line 13, "mount" should read -- amount --.

Col. 6, line 11, "mount" should read -- amount --.

Col. 7, line 31, "Book" should read -- Bock --.

Col. 11, line 56, "Test HI" should read -- Test III --.

Col. 12, line 48, "dally" should read -- daily --.

Col. 14, line 46, "dished" should read -- diminished --.

Col. 16, line 67, "mount" should read -- amount --.

Col. 17, line 4, delete the comma after "wherein".

Col. 17, line 12, $R_f(A)OH$ should read -- $R_f(Q)OH$ --.

Signed and Sealed this

Twenty-second Day of June, 1999

Attest:

Q. TODD DICKINSON

*Attesting Officer*    Acting Commissioner of Patents and Trademarks